US012802402B2

(12) United States Patent
Okano et al.

(10) Patent No.: US 12,802,402 B2
(45) Date of Patent: Nov. 17, 2026

(54) DEFECT ANALYZER, METHOD FOR ANALYZING DEFECT, AND PROGRAM

(71) Applicant: Resonac Corporation, Tokyo (JP)

(72) Inventors: Yu Okano, Tokyo (JP); Shintaro Takada, Tokyo (JP); Takumi Akatsuka, Tokyo (JP); Tetsuya Yokoyama, Tokyo (JP); Shimpei Takemoto, Tokyo (JP); Yoshishige Okuno, Tokyo (JP)

(73) Assignee: Resonac Corporation, Tokyo (JP)

( * ) Notice: Subject to any disclaimer, the term of this patent is extended or adjusted under 35 U.S.C. 154(b) by 197 days.

(21) Appl. No.: 18/848,282

(22) PCT Filed: May 12, 2023

(86) PCT No.: PCT/JP2023/017967
§ 371 (c)(1),
(2) Date: Sep. 18, 2024

(87) PCT Pub. No.: WO2024/014102
PCT Pub. Date: Jan. 18, 2024

(65) Prior Publication Data

US 2025/0239050 A1 Jul. 24, 2025

(30) Foreign Application Priority Data

Jul. 12, 2022 (JP) ................................ 2022-111662

(51) Int. Cl.
*G06V 10/764* (2022.01)
*G01N 21/88* (2006.01)
(Continued)

(52) U.S. Cl.
CPC ....... *G06V 10/764* (2022.01); *G01N 21/8851* (2013.01); *G06V 10/761* (2022.01);
(Continued)

(58) Field of Classification Search
CPC ......... G06T 2207/30148; G06T 7/0004; G06T 7/001; G06T 2207/20084;
(Continued)

(56) References Cited

U.S. PATENT DOCUMENTS

2002/0180468 A1 * 12/2002 Aspir .................. G01R 31/302
324/754.23
2011/0007961 A1 * 1/2011 Iwanaga ............ G01N 21/8851
382/149

(Continued)

FOREIGN PATENT DOCUMENTS

JP 2000-057349 2/2000
JP 2009-068946 4/2009

(Continued)

OTHER PUBLICATIONS

Y. Oshiro et al., "Improving accuracy of Fine-grained Classification using Contrastive Learning", FIT2021 (20th Information Science and Technology Forum), Part 3. Aug. 12, 2021, pp. 7-10.

*Primary Examiner* — Alex Kok S Liew
(74) *Attorney, Agent, or Firm* — IPUSA, PLLC

(57) ABSTRACT

A classification of a defect is analyzed based on an image obtained by imaging the defect. A defect analyzer includes a model storage storing a feature extraction model that is trained based on learned data in which information indicating a classification of each defect is added to an image of the defect, the image of the defect being obtained by imaging the defect that occurs on a surface of an object, and the feature extraction model being configured to extract, from an input image, the image feature that decreases a distance between similar images; a representative-point determination unit configured to determine a representative point for each classification, based on one or more image features that are extracted from respective images of defects by using the feature extraction model; and a relation visualization unit (Continued)

configured to output information indicating a relation between classifications, based on one or more distances that are each between representative points.

10 Claims, 14 Drawing Sheets

(51) Int. Cl.
*G06V 10/74* (2022.01)
*G06V 10/77* (2022.01)
*G06V 10/774* (2022.01)

(52) U.S. Cl.
CPC ........ *G06V 10/7715* (2022.01); *G06V 10/774* (2022.01); *G01N 2021/8887* (2013.01); *G06V 2201/06* (2022.01)

(58) Field of Classification Search
CPC . G06T 2207/20081; G06T 2207/10061; G06T 7/0008; G06T 2207/10056; G06T 2207/30141; G06T 2207/10016; G06T 7/11; G06T 17/20; G06T 2207/30152; G06T 7/586; G06T 2207/10028; G06T 2207/10081; G06T 2207/10116; G06T 2207/10132; G06T 2207/20024; G06T 2207/20044; G06T 2207/20168; G06T 2207/20208; G06T 2207/20221; G06T 2207/30004; G06T 5/00; G06T 5/77; G06T 5/90; G06T 7/0012; G06T 7/0014; G06T 7/344; G06T 7/60; G06T 7/64; G06T 7/97; G06T 11/00; G06T 2207/10152; G06T 2207/20021; G06T 2207/20182; G06T 2207/20212; G06T 2207/30108; G06T 2207/30121; G06T 5/50; G06T 5/60; G06T 5/80; G06T 7/0006; G06T 7/194; G06T 7/55; G06T 7/75
See application file for complete search history.

(56) References Cited

U.S. PATENT DOCUMENTS

| | | | | |
|---|---|---|---|---|
| 2019/0287230 | A1* | 9/2019 | Lu | G06N 3/045 |
| 2020/0161081 | A1* | 5/2020 | Pathangi | H01J 37/28 |

FOREIGN PATENT DOCUMENTS

| | | |
|---|---|---|
| JP | 2018-163527 | 10/2018 |
| WO | 2012/088627 | 7/2012 |
| WO | 2020/004101 | 1/2020 |
| WO | 2021/199706 | 10/2021 |
| WO | 2022/130762 | 6/2022 |

* cited by examiner

DEFECT ANALYZER, METHOD FOR ANALYZING DEFECT, AND PROGRAM

TECHNICAL FIELD

The present disclosure relates to a defect analyzer, a method for analyzing a defect, and a program.

BACKGROUND

Techniques in which images are classified based on distance metrics between images that are learned using deep learning are used. For example, Patent Document 1 discloses a user interface through which interaction is performed according to a user preference by differentiating between users based on a distance metric that is obtained by performing learning from face images of the users.

RELATED-ART DOCUMENT

Patent Document

Patent Document 1: WO2012/88627

SUMMARY

Problem to be Solved by the Invention

However, in a conventional image classification technique, there is a problem that it is difficult to classify defects that occur on a surface of an object. For example, parts that constitute a human face are generally commonly used, and thus it is relatively easy to improve accuracy in classifying face images. On the other hand, there are a variety of defects that occur on the surface of the object, and in many cases, it is difficult to classify the defects even when classification is performed based on human-judgement. Further, when only a classification result in which the defects are classified is presented, it is difficult to recognize a similarity relationship between classifications.

In view of the above technical problem, an object of the present disclosure is to analyze a classification of a defect based on an image that is obtained by imaging the defect.

Means for Solving the Problem

The present disclosure provides the following configurations.

[1] A defect analyzer includes:

a model storage configured to store a feature extraction model that is trained based on learned data in which information indicating a classification of each defect is added to an image of the defect, the image of the defect being obtained by imaging the defect that occurs on a surface of an object, and the feature extraction model being configured to extract, from an input image, an image feature that decreases a distance between similar images;

a representative-point determination unit configured to determine a representative point for each classification, based on one or more image features that are extracted from respective images of defects by using the feature extraction model; and a relation visualization unit configured to output information indicating a relation between classifications, based on one or more distances that are each between representative points.

[2] The defect analyzer described in [1] may further include:

an image receiver configured to receive an input of a verification image that is obtained by imaging the surface of the object;

a feature extraction unit configured to generate, as a verification feature, the image feature that is extracted from the verification image by using the feature extraction model; and a classification estimation unit configured to estimate a classification for the verification image based on a distance between the verification feature and each of the representative points.

[3] The defect analyzer described in [2] may further include:

a similar-image extraction unit configured to extract, from the learned data, the image of the defect that is similar to the verification image, based on one or more distances that are each between image features.

[4] The defect analyzer described in any one of [1] to [3] may further include:

a classification aggregator configured to determine a consolidated classification that includes given classifications for which a distance between representative points is decreased; and a model training unit configured to retrain the feature extraction model based on the learned data to which information indicating the consolidated classification is assigned.

[5] In the defect analyzer described in any one of [1] to [4], the information indicating the relation may include a heat map in which distances between representative points are each color-coded according to a length of the distance, a scatter plot in which the representative points are arranged based on multi-dimensional scaling, or a dendrogram in which the representative points are hierarchized based on hierarchical clustering.

[6] In the defect analyzer described in [2], the classification estimation unit may be configured to compare the distance between the verification feature and each of representative points, with a threshold, and estimate the classification for the verification image.

[7] In the defect analyzer described in [6], upon occurrence of a condition in which there are given classifications for which the distance is less than or equal to the threshold, the classification estimation unit may be configured to estimate that the verification image matches the given classifications.

[8] In the defect analyzer described in [6], upon occurrence of a condition in which there are no classification for which the distance is less than or equal to the threshold, the classification estimation unit may be configured to estimate that the verification image matches a new classification different from the classifications.

[9] A method for analyzing a defect executed by a defect analyzer includes:

storing, in a model storage, a feature extraction model that is trained based on learned data in which information indicating a classification of each defect is added to an image of the defect, the image of the defect being obtained by imaging the defect that occurs on a surface of an object, and the feature extraction model being configured to extract, from an input image, an image feature that decreases a distance between similar images;

determining a representative point for each classification, based on one or more image features that are extracted from respective images of defects by using the feature extraction model; and outputting information indicating a relation between classifications, based on one or more distances that are each between representative points.

[10] A program causes a computer to execute a method including:

storing, in a model storage, a feature extraction model that is trained based on learned data in which information indicating a classification of each defect is added to an image of the defect, the image of the defect being obtained by imaging the defect that occurs on a surface of an object, and the feature extraction model being configured to extract, from an input image, an image feature that decreases a distance between similar images;

determining a representative point for each classification, based on one or more image features that are extracted from respective images of defects by using the feature extraction model; and outputting information indicating a relation between classifications, based on one or more distances that are each between representative points.

Effects of the Invention

In one aspect of the present disclosure, a classification of a defect can be analyzed based on an image that is obtained by imaging the defect.

MODE FOR CARRYING OUT THE INVENTION

Figure 1:
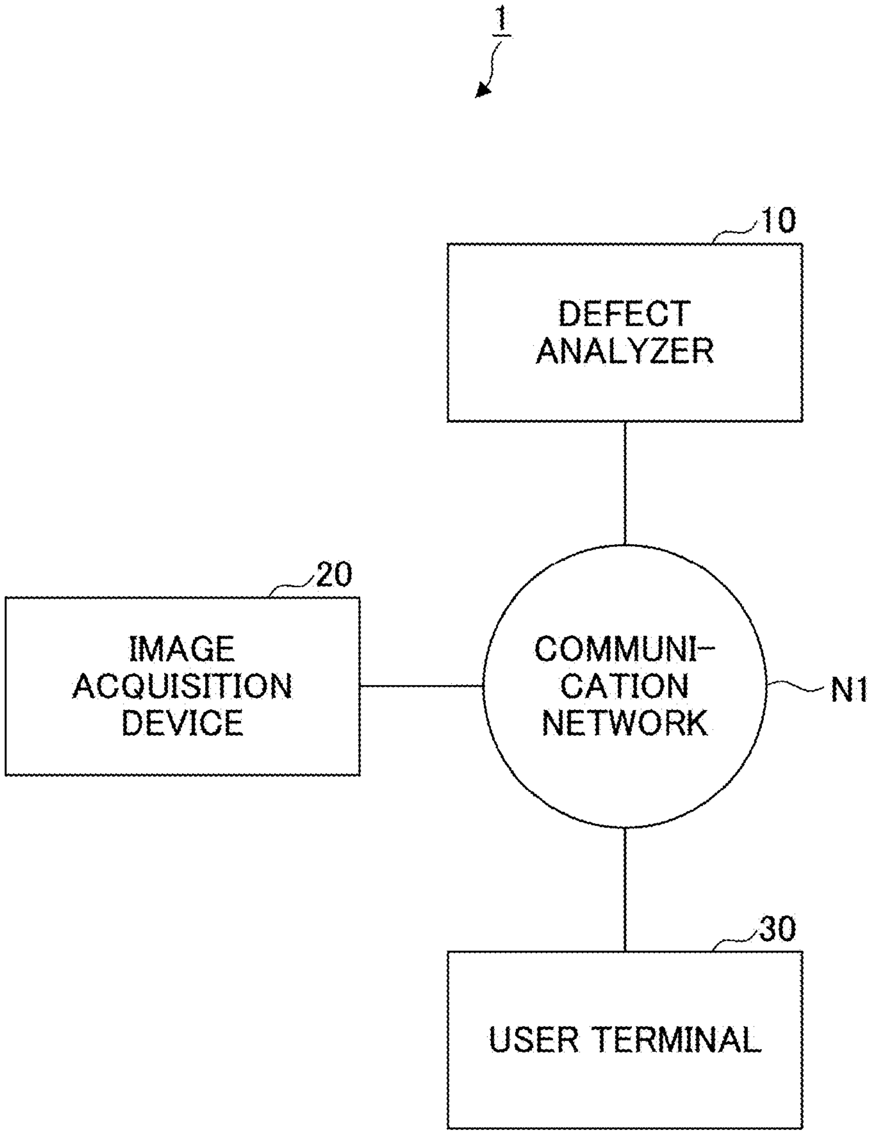
FIG. 1 is a block diagram showing an example of the overall configuration of a defect analysis system.

Hereinafter, embodiments of the present invention will be described with reference to the accompanying drawings. In the specification and the drawings, components having substantially the same functional configuration are denoted by the same numerals, and redundant description thereof will be omitted.

Embodiments

Defects may occur on a surface of an object due to various causes. In order to identify the causes of the defects, images that are obtained by imaging the defects are analyzed. For example, when a defect occurs in a manufacturing process of a product, a failure may potentially occur in the manufacturing process. In such a situation, when the defect is found in the product in an inspection process, the defect of the product is imaged, and the imaged defect serves as a clue for identifying the failure in the manufacturing process.

In a conventional image classification technique, each image is classified by assigning a unique class to the image. However, there are a variety of defects that occur on the surface of an object, and in many cases, it is difficult for even a person to classify these defects. In the conventional image classification technique, for example, there are cases where accuracy in classifying an intermediate defect similar to a plurality of classes or a new defect different from all of predefined classes may be reduced. On the other hand, there are cases where a subtle difference between defects may be used as important information for identifying what has caused the defects. In view of the above situation, by analyzing the relation between classifications of defects, useful information related to handling of the object can be obtained.

One embodiment of the present disclosure will be described using a defect analysis system that classifies an image (hereinafter also referred to as an "image of a defect") obtained by imaging each defect that occurs on a surface of an object, and that analyzes the relation between classifications of defects. An example of the object according to the present embodiment is an article having a mirror surface, such as an optical product. Another example of the object according to the present embodiment is a single crystal substrate such as a semiconductor wafer. The object according to the present embodiment is not limited to these examples, and a mirrored article, such as an aluminum substrate for a photosensitive drum used in a photosensitive drum of a laser printer, may be adopted.

The defect in the present embodiment includes a linear or planar flaw that occurs on the surface of the object, or includes dirt or a foreign substance or the like that is attached to the surface of the object.

In the defect analysis system according to the present embodiment, a feature extraction model that extracts one or more image features from an input image is trained using learned data that is collected in advance. The learned data is data in which information (hereinafter may be also referred to as a "defect label") indicating a classification of the defect is assigned to an image (hereinafter may be also referred to as a "learned image") of the defect that is used for model training.

The feature extraction model in the present embodiment is trained with a metric learning approach. In metric learning, images are each arranged at one point in a high-dimensional embedding space such that a distance between similar images decreases.

The defect analysis system according to the present embodiment extracts images feature of learned images, by using the trained feature extraction model, and then determines a representative point for each classification of a given defect that is indicated by the defect label. The defect analysis system outputs information indicating the relation between classifications, based on distances between representative points for the classifications. An example of the information indicating the relation between the classifications includes a heat map, a scatter plot, a dendrogram, or the like that expresses the relation between the classifications. The information indicating the relation between the classifications is not limited to these examples, and various representation forms that are easy to understand for a user of the defect analysis system can be used.

Also, the defect analysis system according to the present embodiment extracts an image feature of a given image (hereinafter also referred to as a "verification image") of a given defect, for which a classification of the given defect is not specified using the trained feature extraction model. Then, the defect analysis system estimates the classification of the given defect that is imaged in the verification image, based on one or more distances from representative points for respective classifications. At this time, an image (hereinafter may be also referred to as a "similar image") similar to the verification image is extracted from a given learned image to which a defect label indicating the same classification as the estimated classification is assigned, and the similar image may be output together with an estimation result.

Further, when it is determined that the verification image does not match any classification, the defect analysis system according to the present embodiment creates a new classification (hereinafter may be also referred to as an "additional classification"). Also, when there are multiple classifications for which a short distance between representative points is obtained, the defect analysis system aggregates these classifications into the new classification (hereinafter may be also referred to as a "consolidated classification"). Then, the defect analysis system retrains the feature extraction model using learned data to which the new classification or the consolidated classification is assigned.

<Overall Configuration of Defect Analysis System>

First, the overall configuration of the defect analysis system according to the present embodiment will be described with reference to FIG. 1. FIG. 1 is a block diagram showing an example of the overall configuration of the defect analysis system according to the present embodiment.

As shown in FIG. 1, a defect analysis system 1 according to the present embodiment includes a defect analyzer 10, an image acquisition device 20, and a user terminal 30. The defect analyzer 10, the image acquisition device 20, and the user terminal 30 are connected to one another via a communication network N1 such as a local area network (LAN) or the Internet, so as to allow for data communications.

The defect analyzer 10 is an information processing device, such as a personal computer, a workstation, or a server, that analyzes, in response to a request from the user terminal 30, an image of a defect that is obtained by imaging the defect that occurs on the surface of the object. The defect analyzer 10 receives the image of the defect to be analyzed, from the user terminal 30. The defect analyzer 10 analyzes the received image of the defect, and transmits an analysis result to the user terminal 30.

The image acquisition device 20 is an optical device that acquires the image of the defect by imaging the defect occurring on the surface of the object. The image acquisition device 20 may include a digital camera that captures a still image, or may include a video camera that captures a moving image. The image acquisition device 20 may be an information processing device such as a personal computer that is connected to various cameras, or may be a surface inspection device equipped with various cameras.

The user terminal 30 is an information processing terminal such as a personal computer, a tablet computer, or a smartphone that is operated by a user. The user terminal 30 acquires the image of the defect to be analyzed, from the image acquisition device 20, in response to a user operation, and then transmits the image of the defect to the defect analyzer 10. The user terminal 30 receives an analysis result from the defect analyzer 10, and outputs the analysis result to the user.

The entire configuration of the defect analysis system 1 shown in FIG. 1 is merely an example, and various examples of the system configuration may be illustrated according to applications and purposes. For example, the defect analyzer 10 may be implemented by a plurality of computers, or may be implemented as a service of cloud computing. Further, for example, the defect analysis system 1 may be implemented by a standalone information processing device that has functions of the defect analyzer 10, the image acquisition device 20, and the user terminal 30.

<Hardware Configuration of Defect Analysis System>

Hereinafter, a hardware configuration of the defect analysis system 1 according to the present embodiment will be described with reference to FIG. 2.

<Hardware Configuration of Computer>

The defect analyzer 10, the image acquisition device 20, and the user terminal 30 according to the present embodiment are each implemented by, for example, a computer. FIG. 2 is a block diagram illustrating an example of the hardware configuration of a computer 500 according to the present embodiment.

Figure 2:
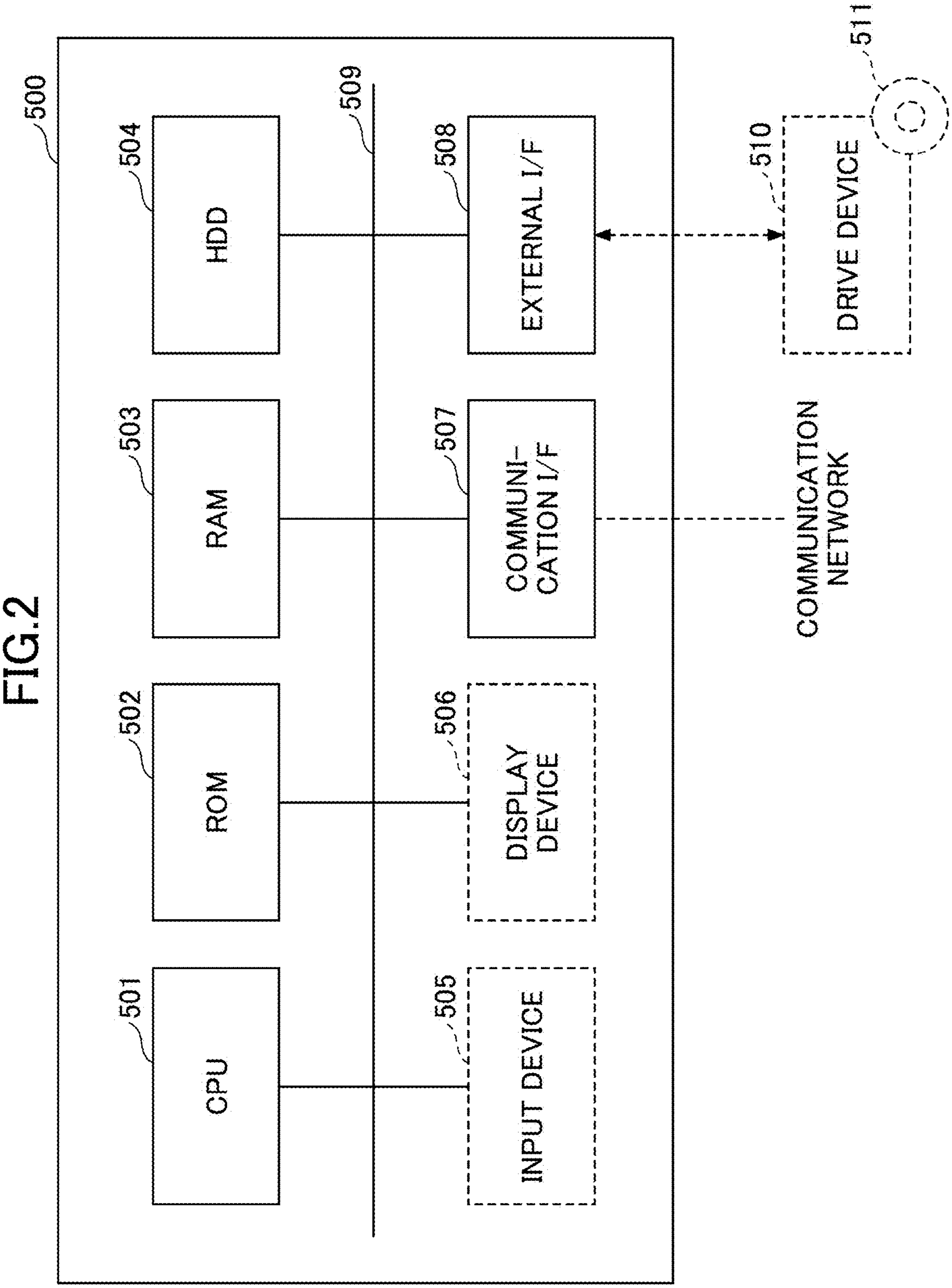
FIG. 2 is a block diagram showing an example of a hardware configuration of a computer.

As illustrated in FIG. 2, the computer 500 includes a central processing unit (CPU) 501, a read only memory (ROM) 502, a random access memory (RAM) 503, a hard disk drive (HDD) 504, a input device 505, a display device 506, a communication interface (I/F) 507, and an external I/F 508. The CPU 501, the ROM 502, and the RAM 503 constitute the computer. These hardware components of the computer 500 are connected to one another via a bus line 509. The input device 505 and the display device 506 may be used in a manner in which the input device 505 and the display device 506 are connected to the external I/F 508.

The CPU 501 is an arithmetic device that controls the entire computer 500 and implements the function of the entire computer 500, by reading, to the RAM 503, a program or data retrieved from a storage device such as the ROM 502 or the HDD 504, and by performing processing.

The ROM 502 is an example of a non-volatile semiconductor memory (storage device) that can retain the program and data even when power is turned off. The ROM 502 functions as a main storage device that stores various programs, data, and the like that are necessary for the CPU 501 to execute the various programs that are installed in the HDD 504. Specifically, the ROM 502 stores boot programs such as a BIOS (basic input/output system) and an EFI (extensible firmware interface) that are to be executed at start-up of the computer 500, and the ROM 502 also stores data relating to OS (operating system) settings, network settings, and the like.

The RAM 503 is an example of a volatile semiconductor memory (storage device) in which one or more programs and data are erased when power is turned off. The RAM 503 includes, for example, a dynamic random access memory (DRAM), a static random access memory (SRAM), or the like. The RAM 503 provides a work area that is developed when the CPU 501 executes various programs installed in the HDD 504.

The HDD 504 is an example of a non-volatile storage device that stores one or more programs and data. The programs and data stored in the HDD 504 include the OS that is basic software for controlling the entire computer 500, and also include applications or the like for providing various functions on the OS. Instead of using the HDD 504, the computer 500 may use a storage medium (for example, a solid state drive (SSD) or the like) that utilizes a flash memory as a storage medium.

The input device 505 may include a touch panel, operation keys, buttons, a keyboard, a mouse, a microphone, and the like that are used by the user to enter various signals.

The display device 506 may include a display such as a liquid crystal or organic electro-luminescence (EL) that displays a screen, and also may include a speaker or the like that outputs sound data such as voice.

The communication I/F 507 is an interface that is connected to a communication network and is used for the computer 500 to perform data communications.

The external I/F 508 is an interface with an external device. The external device may include a drive device 510 or the like.

The drive device 510 is a device in which a recording medium 511 is set. The recording medium 511 in this description may include a medium that optically, electrically, or magnetically records information, such as a CD-ROM, a flexible disk, or a magneto-optical disk. The recording medium 511 may include a semiconductor medium or the like that electrically records information, such as a ROM or a flash memory. With this arrangement, the computer 500 can perform reading and/or writing with respect to the recording medium 511, by using the external I/F 508.

Various programs to be installed in the HDD 504 are installed, for example, by setting a distributed recording medium 511 in the drive device 510 that is connected to the external I/F 508, and by reading the various programs recorded in the recording medium 511 through the drive device 510. Alternatively, the various programs to be installed in the HDD 504 may be installed by downloading the programs via the other network, which is different from the communication network, through the communication I/F 507.

<<Functional Configuration of Defect Analysis System>>

Figure 3:
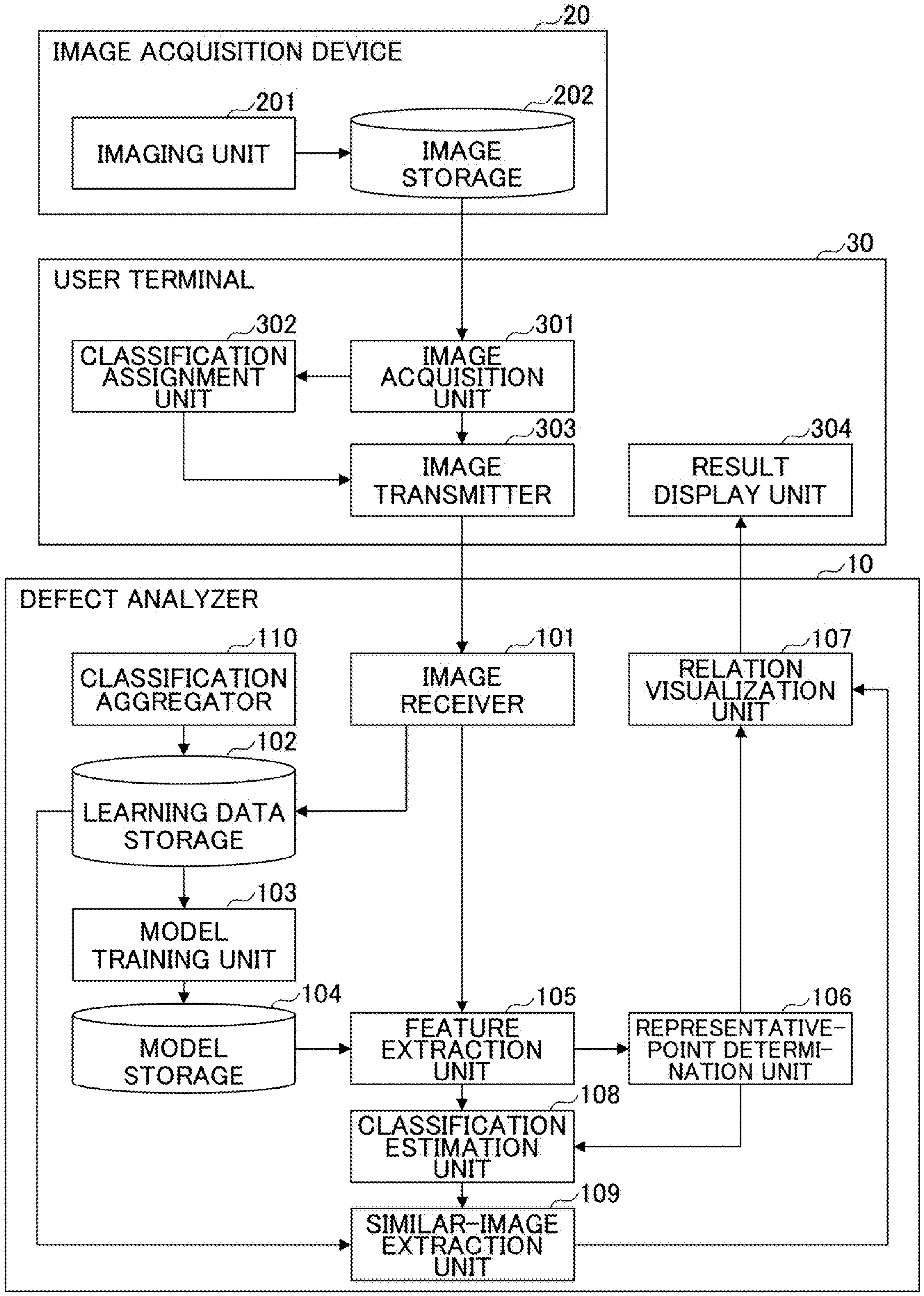
FIG. 3 is a block diagram showing an example of a functional configuration of the defect analysis system.

Hereinafter, the functional configuration of the defect analysis system according to the present embodiment will be described with reference to FIG. 3. FIG. 3 is a block diagram showing an example of the functional configuration of the defect analysis system 1 according to the present embodiment.

<Functional Configuration of Defect Analyzer>

As shown in FIG. 3, the defect analyzer 10 according to the present embodiment includes an image receiver 101, a learned data storage 102, a model training unit 103, a model storage 104, a feature extraction unit 105, a representative-point determination unit 106, a relation visualization unit 107, a classification estimation unit 108, a similar-image extraction unit 109, and a classification aggregator 110.

The image receiver 101, the model training unit 103, the feature extraction unit 105, the representative-point determination unit 106, the relation visualization unit 107, the classification estimation unit 108, the similar-image extraction unit 109, and the classification aggregator 110 are implemented by a process that the program, which is read from the HDD 504 shown in FIG. 2 and loaded into the RAM 503, causes the CPU 501 to execute. The learned data storage 102 and the model storage 104 are implemented by the HDD 504 illustrated in FIG. 2.

The image receiver 101 receives one or more images of defects from the user terminal 30. The images of the defects received by the image receiver 101 include one or more learned images to which respective defect label are assigned, and include one or more verification images to which no defect label is assigned.

The learned data storage 102 stores the one or more learned images received by the image receiver 101, as learned data. The learned data is data to which a given defect label is assigned. It is sufficient when a predetermined number of pieces of learned data are used to train the feature extraction model. The predetermined number of pieces of learned data that are required to train the feature extraction model vary depending on a model type, but the predetermined number of pieces of learned data are, for example, about 100 pieces for each classification.

The model training unit 103 trains the feature extraction model, by using the learned data that is stored in the learned data storage 102. The feature extraction model is a machine-learned model that extracts, from an input image, a given image feature that enables a distance between similar images to decrease. The model training unit 103 may train the feature extraction model by applying an approach such as transfer learning or fine tuning, to a pretrained image classification model. An example of the feature extraction model is an image classification model using deep learning such as Alex-Net or Res-Net. The image feature is defined, for example, by a 256-dimensional feature vector.

The model storage 104 stores the feature extraction model that is trained by the model training unit 103.

The feature extraction unit 105 extracts an image feature from the learned image or the verification image, by using the feature extraction model stored in the model storage 104. In the following description, the image feature extracted from the learned image may be referred to as a "learned feature." The image feature extracted from the verification image may be referred to as a "verification feature."

The representative-point determination unit 106 determines a representative point for each classification of the defect, based on the learned feature extracted by the feature extraction unit 105. The representative point for the classification is defined by coordinates representing a learned feature set that corresponds to learned images to which the same defect label is assigned when the learned features are arranged in an embedding space. An example of the representative point is an average of feature vectors. Another example of the representative point is a centroid of a feature vector set. The representative point is not limited to these examples, and any point may be determined as long as the point is representative of the learned feature set for each classification.

The relation visualization unit 107 generates information indicating the relation between classifications, based on distances that are each between representative points for classifications, and transmits the information to the user terminal 30. An example of the distance is a cosine similarity level. The other example of the distance includes the Euclidean distance or the Mahalanobis distance. The above distance is not limited to these distance metrics, and any distance metric corresponding to the feature vector can be used.

A heat map is, for example, a matrix in which distances, which are each between representative points, are color-coded according to distance lengths. A scatter plot is a graph in which representative points for classifications are arranged on a two dimensional plane based on, for example, multi-dimensional scaling (MDS). A dendrogram is, for example, a tree diagram in which representative points of classifications are hierarchized in a tree structure based on hierarchical clustering.

The classification estimation unit 108 estimates a classification of the defect that is imaged in the verification image, based on a distance between the verification feature extracted by the feature extraction unit 105 and the representative point for each classification. The classification estimation unit 108 estimates the classification of the defect imaged in the verification image, by comparing the distance between the verification feature and the representative point, with a predetermined threshold.

The classification estimation unit 108 assigns a defect label indicating the estimated classification, to the verification image, and may store the verification image in the learned data storage 102. With this arrangement, the verification image for which the classification of the defect is estimated is added as new learned data.

The similar-image extraction unit 109 extracts one or more similar images similar to the verification image, from learned images stored in the learned data storage 102, based on the distance between each of the learned features and the verification feature.

When there are a plurality of classifications for which a distance between representative points is less than or equal to the predetermined threshold, the classification aggregator 110 determines a consolidated classification that includes the plurality of classifications. When the classification aggregator 110 determines the consolidated classification, the classification aggregator 110 updates, using learned data stored in the learned data storage 102, defect labels representing respective classifications that are included in the consolidated classification, to thereby set a defect label representing the consolidated classification.

<<Functional Configuration of Image Acquisition Device>>

As shown in FIG. 3, the image acquisition device 20 according to the present embodiment includes an imaging unit 201 and an image storage 202.

The imaging unit 201 is implemented by a camera connected to the external I/F 508 illustrated in FIG. 2. The image storage 202 is implemented by the HDD 504 illustrated in FIG. 2.

The imaging unit 201 images a defect occurring on the surface of the object, and generates an image of the defect. The imaging unit 201 may capture a still image, or may capture a moving image and then extract an image in which a defect is reflected.

The image storage 202 stores one or more images of defects that are imaged by the imaging unit 201.

<<Functional Configuration of User Terminal 30>>

As shown in FIG. 3, the user terminal 30 according to the present embodiment includes an image acquisition unit 301, a classification assignment unit 302, an image transmitter 303, and a result display unit 304.

The image acquisition unit 301, the classification assignment unit 302, and the image transmitter 303 are implemented by a process that the program, which is read from the HDD 504 shown in FIG. 2 and loaded into the RAM 503, causes the CPU 501 to execute. The result display unit 304 is implemented by the display device 506 illustrated in FIG. 2.

The image acquisition unit 301 acquires the image of each defect from the image acquisition device 20, in response to a user request.

The classification assignment unit 302 generates the learned image by assigning a defect label to the image of the defect in response to a user operation. As the image of the defect to which the defect label is assigned, only the image of a given defect that allows the user to specify a classification of the given defect may be selected.

The image transmitter 303 transmits the learned image or the verification image to the defect analyzer 10, in response to a user operation.

The result display unit 304 receives information indicating the relation between classifications, from the defect analyzer 10, and outputs the information to the display device 506 or the like.

<Process Procedure of Defect Analysis System>

Hereinafter, a process procedure of a defect analysis method executed by the defect analysis system 1 according to the present embodiment will be described with reference to FIGS. 4 to 14. The defect analysis method according to the present embodiment includes a relation visualization process (see FIG. 4), an image classification process (see FIG. 9), and a model retraining process (see FIG. 14).

<<Relation Visualization Process>>

Figure 4:
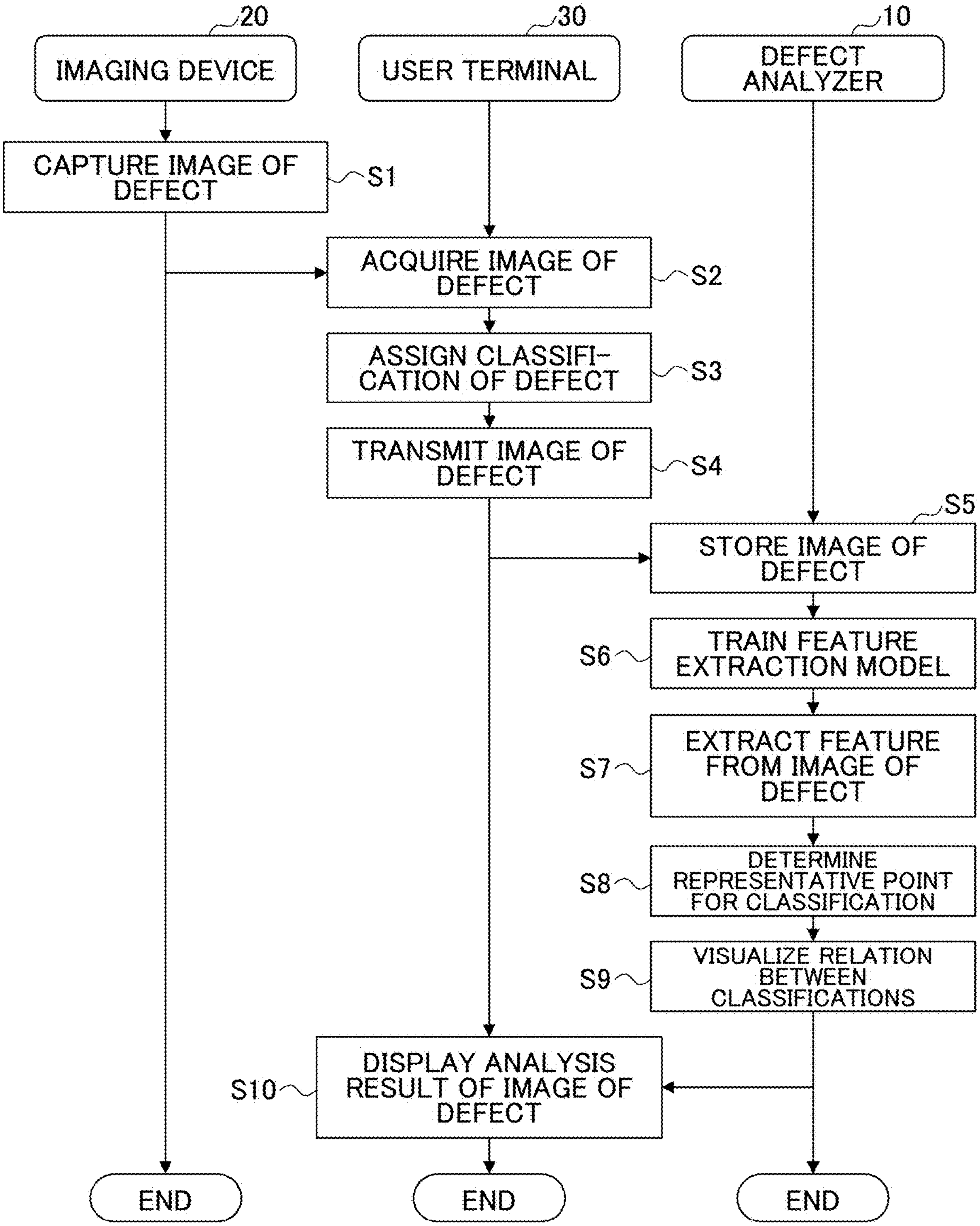
FIG. 4 is a flowchart showing an example of the procedure of a relation visualization process.

FIG. 4 is a flowchart illustrating an example of the procedure of the relation visualization process according to the present embodiment. The relation visualization process is a process in which the feature extraction model is trained using one or more learned images, and then the relation between classifications of defects is visualized based on image features extracted from the learned images.

In step S1, the imaging unit 201 included in the image acquisition device 20 images a defect on the object, and generates an image of the defect. Next, the imaging unit 201 stores the generated image of the defect in the image storage 202. The image storage 202 stores a plurality of images of defects.

In step S2, the image acquisition unit 301 included in the user terminal 30 transmits a request to acquire learned images to the image acquisition device 20, in response to a user operation. The image acquisition device 20 transmits a plurality of images of defects that are accumulated in the image storage 202, to the user terminal 30, in response to the request to acquire the learned images. The image acquisition unit 301 transmits the plurality of images of defects that are received from the image acquisition device 20, to the classification assignment unit 302.

In step S3, the classification assignment unit 302 included in the user terminal 30 receives the plurality of images of defects from the image acquisition unit 301. Next, the classification assignment unit 302 assigns a defect label to each of the plurality of images of defects, in accordance with a user operation, and thereby generates learned images. Subsequently, the classification assignment unit 302 transmits the generated learned images to the image transmitter 303.

The classification of each defect may be arbitrarily set by the user. The defect label is data indicating a code value that is assigned to the classification of each defect. The types of classifications of defects are not limiting, and the user may set a number of classifications that is considered necessary for analysis.

The classifications according to the present embodiment includes 0: scratch, 1: residue of marker, 2: vertical line, 3: surface stain, 4: blurry, 5: mottle, 6: short fiber, 7: long fiber, 8: sagging, 9: thin horizontal line, 10: thick horizontal line, 11: ellipse point, 12: thick black point, 13: small haze, and 14: small black point. A numerical value before ":" is a code value assigned to a given classification, and a character string after ":" is a classification name.

As the code value of each classification, any value may be adopted as long as the code value does not overlap with code values of other classifications. As a classification name, any name that is easily understood by the user may be adopted.

Figure 5:
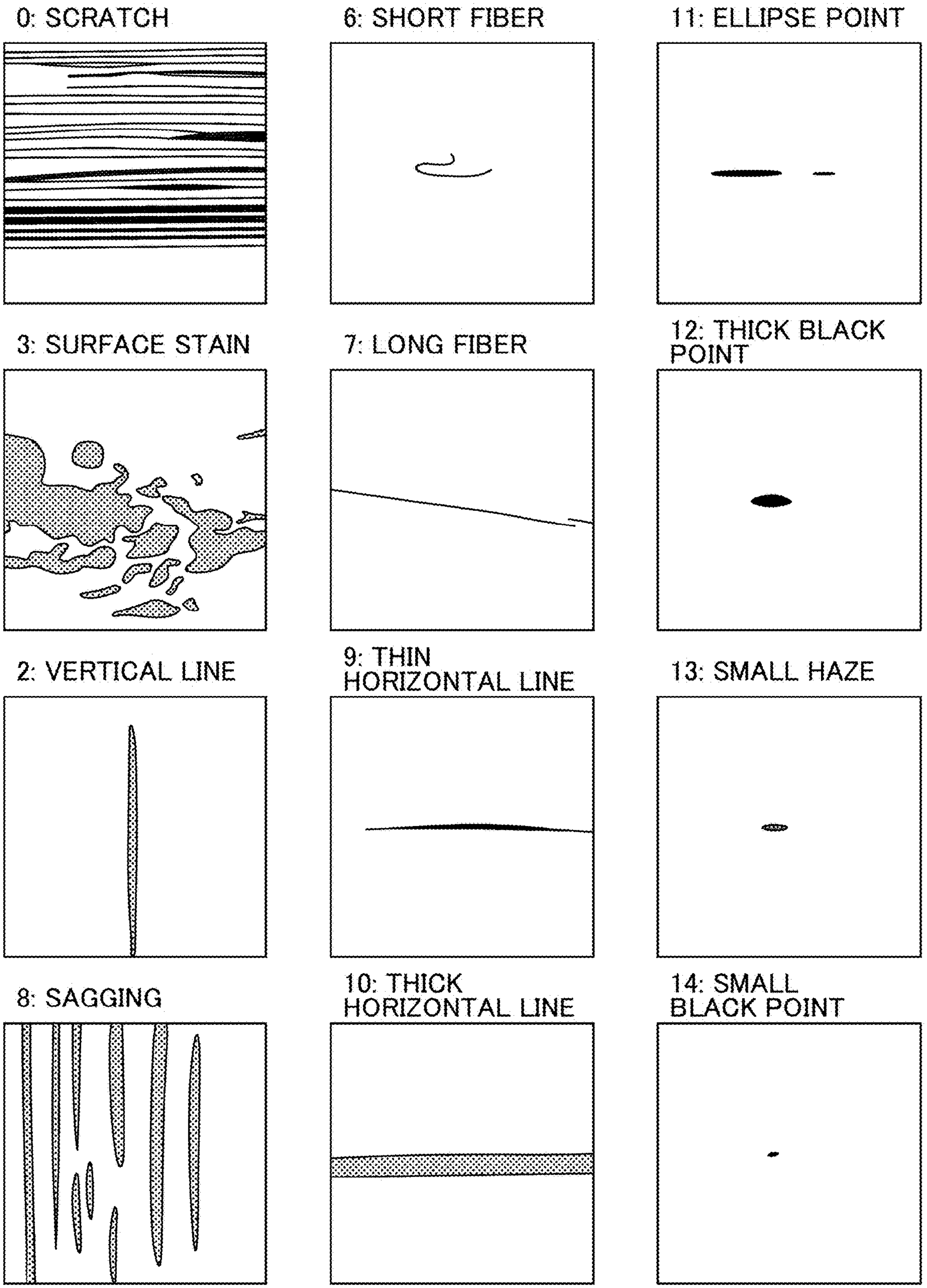
FIG. 5 is a diagram showing an example of images of defects.

FIG. 5 is a diagram showing an example of images of defects. As shown in FIG. 5, there may be a wide variety of defects occurring on the surface of an object. In FIG. 5, examples of the images of the defects include images corresponding to 0: scratch, 3: surface stain, 2: vertical line, 8: sagging, 6: short fiber, 7: long fiber, 9: thin horizontal line, 10: thick horizontal line, 11: ellipse point, 12: thick black point, 13: small haze, and 14: small black point.

In the example of FIG. 5, each image having a clear feature of the defect is illustrated as an example, but an intermediate defect for which it is difficult to determine which classification the defect belongs to may occur. For example, when there is a horizontally long linear flaw, it may be difficult to determine whether such a flaw should be 9: thin horizontal line or 10: thick horizontal line. Also, when there is a linear black defect, it may be difficult to determine whether such a defect should be 7: long fiber or 9: thin horizontal line. Further, there are cases where a plurality of defects of different types may be imaged in one image.

The user selects only one or more images of defects each of which clearly matches a specific classification, from acquired images of defects, and then may assign defect labels to the respective selected defect images. Any image of a given defect to which the user does not assign a defect label may be used as a verification image to be used in the image classification process.

Referring back to FIG. 4, the description will be provided as follows. In step S4, the image transmitter 303 included in the user terminal 30 receives a plurality of learned images from the classification assignment unit 302. Next, the image transmitter 303 transmits the plurality of learned images to the defect analyzer 10, in response to a user operation.

In step S5, the image receiver 101 included in the defect analyzer 10 receives the plurality of learned images from the user terminal 30. Next, the image receiver 101 stores the received plurality of learned images as learned data in the learned data storage 102.

In step S6, the model training unit 103 included in the defect analyzer 10 retrieves learned data from the learned data storage 102. Next, the model training unit 103 trains the feature extraction model using the retrieved learned data. Subsequently, the model training unit 103 stores the trained feature extraction model in the model storage 104.

In step S7, the feature extraction unit 105 included in the defect analyzer 10 reads out the feature extraction model stored in the model storage 104. Next, for each classification of the defect indicated by a given defect label, the feature extraction unit 105 retrieves one or more learned images from the learned data storage 102.

Subsequently, the feature extraction unit 105 generates one or more learned features by inputting the one or more learned images to the feature extraction model for each classification of the given defect. The feature extraction unit 105 transmits the generated learned features to the representative-point determination unit 106, for each classification of the given defect.

In step S8, the representative-point determination unit 106 included in the defect analyzer 10 receives the learned features for each classification of the given defect, from the feature extraction unit 105. Next, the representative-point determination unit 106 arranges the learned features in the embedding space. Subsequently, the representative-point determination unit 106 determines a representative point for each classification of the defects, based on the embedding space in which the learned features are arranged. The representative-point determination unit 106 transmits information indicating determined representative points to the relation visualization unit 107.

In step S9, the relation visualization unit 107 included in the defect analyzer 10 receives the information indicating the representative points, from the representative-point determination unit 106. Next, the relation visualization unit 107 calculates distances that are each between representative points for the respective classifications. Subsequently, the relation visualization unit 107 generates information indicating the relation between classifications, based on the distances between the representative points. The relation visualization unit 107 transmits the information indicating the relation between the classifications, to the user terminal 30.

The relation visualization unit 107 can provide the relation between the classifications, with various approaches. A first example of the information indicating the relation between the classifications is a heat map expressing the relation between the classifications. A second example of the information indicating the relation between the classifications is a scatter plot expressing the relation between the classifications. A third example of the information indicating the relation between the classifications is a dendrogram expressing the relation between the classifications.

(Heat Map)

Figure 6:
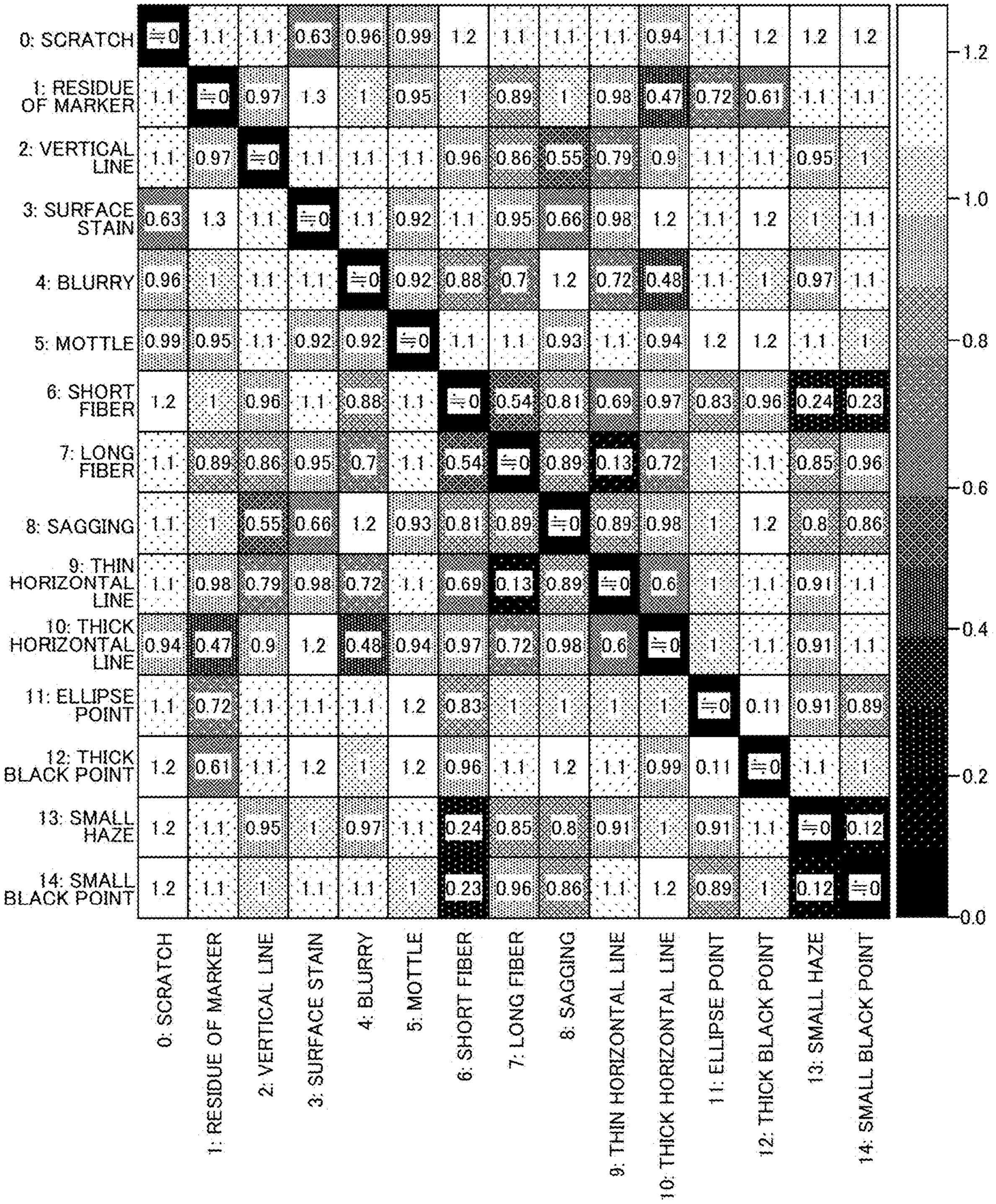
FIG. 6 is a diagram showing an example of a heat map in the relation visualization process.

FIG. 6 is a diagram illustrating an example of the heat map in the relation visualization process. As shown in FIG. 6, the heat map in the relation visualization process is a matrix in which distances between representative points are each color-coded according to a length between the representative points.

In the example of FIG. 6, each distance between representative points is set as a cosine similarity level, and distances are color-coded in light of combinations of classifications. A closer distance to 0 indicates that classifications of the defects are similar to each other, and a closer distance to 2 indicates that less similar classifications of the defects are present. In FIG. 6, colors are classified such that a shorter distance is illustrated with darker colors. The user can recognize a similarity relationship between classifications, by checking color shading in the heat map.

(Scatter Plot)

Figure 7:
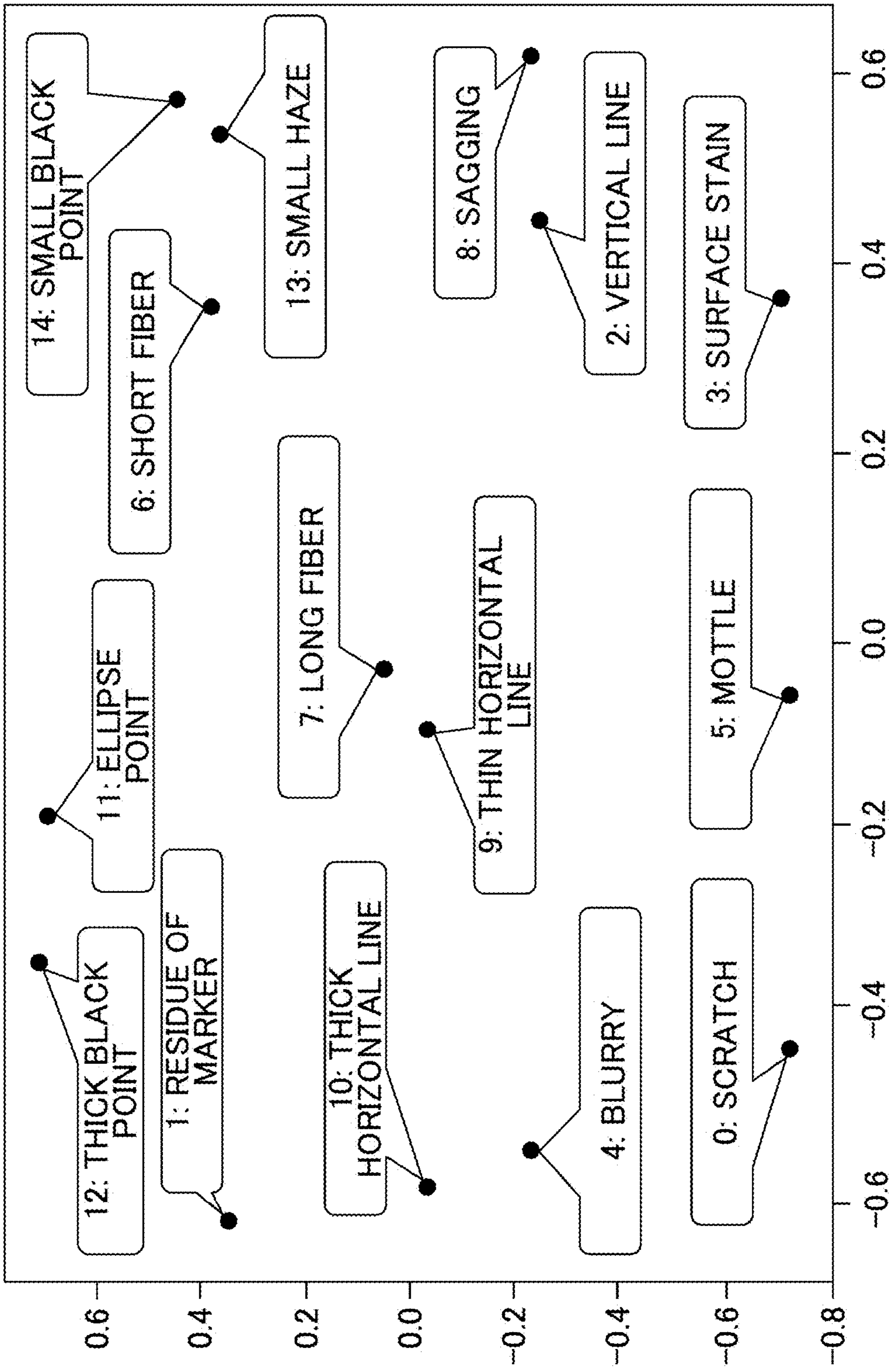
FIG. 7 is a diagram showing an example of a scatter plot in the relation visualization process.

FIG. 7 is a diagram illustrating an example of the scatter plot in the relation visualization process. As shown in FIG. 7, the scatter plot in the relation visualization process is a graph in which representative points for classifications are arranged on a two-dimensional plane based on multi-dimensional scaling. The user can recognize a similarity relationship between classifications, by checking a distance between representative points in the scatter plot.

(Dendrogram)

Figure 8:
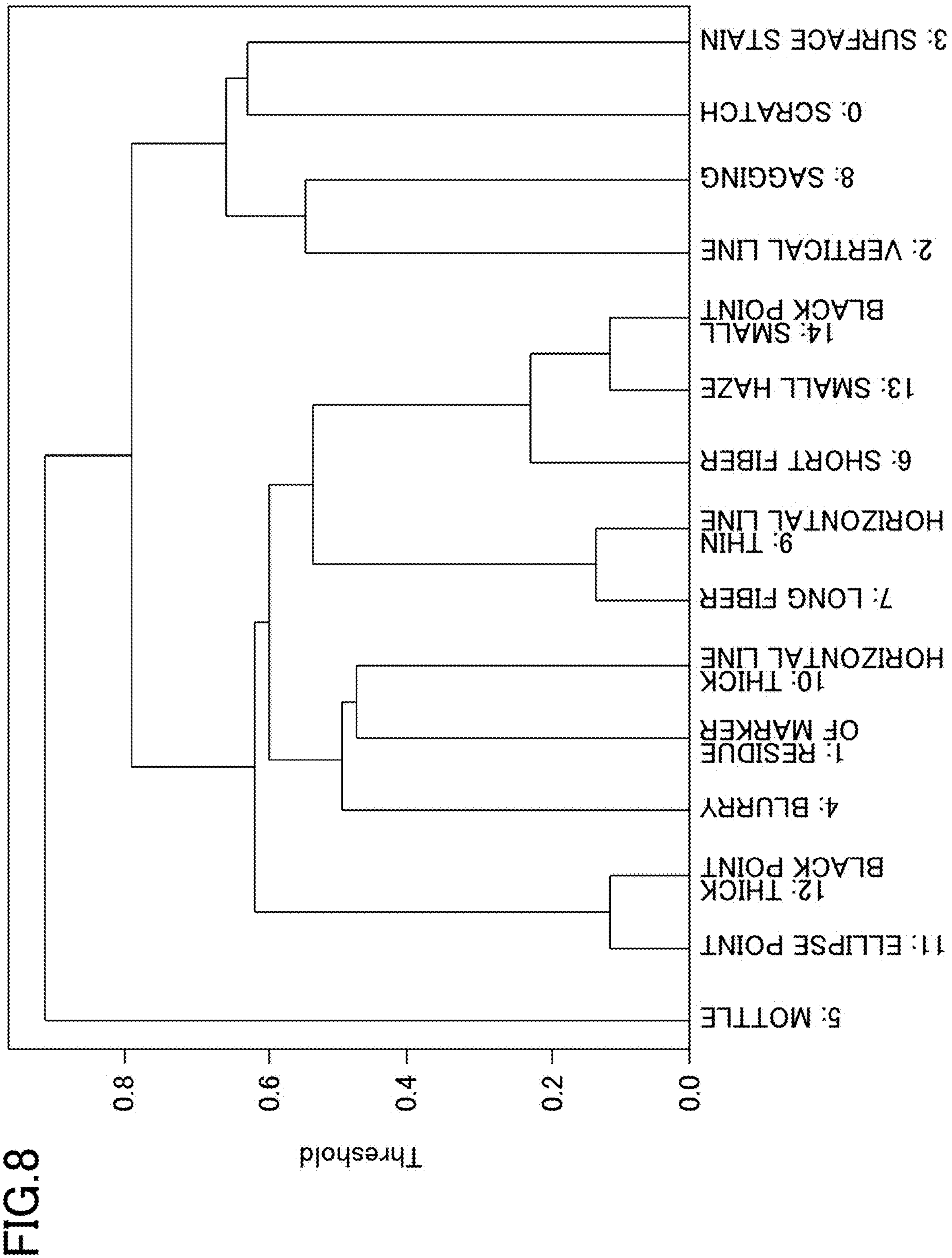
FIG. 8 is a diagram showing an example of a dendrogram in the relation visualization process.

FIG. 8 is a diagram illustrating an example of the dendrogram in the relation visualization process. As shown in FIG. 8, the dendrogram in the relation visualization process is a tree diagram in which representative points of classifications are hierarchized in a tree structure based on hierarchical clustering. The user can recognize a similarity relationship between classifications, by checking a length of a path connecting the classifications and a height of a branch in the dendrogram.

Referring back to FIG. 4, the description will be provided as follows. In step S10, the result display unit 304 included in the user terminal 30 receives the information indicating the relation between the classifications, from the defect analyzer 10. Next, the result display unit 304 displays the information indicating the relation between the classifications, on the display device 506.

<<Image Classification Process>>

Figure 9:
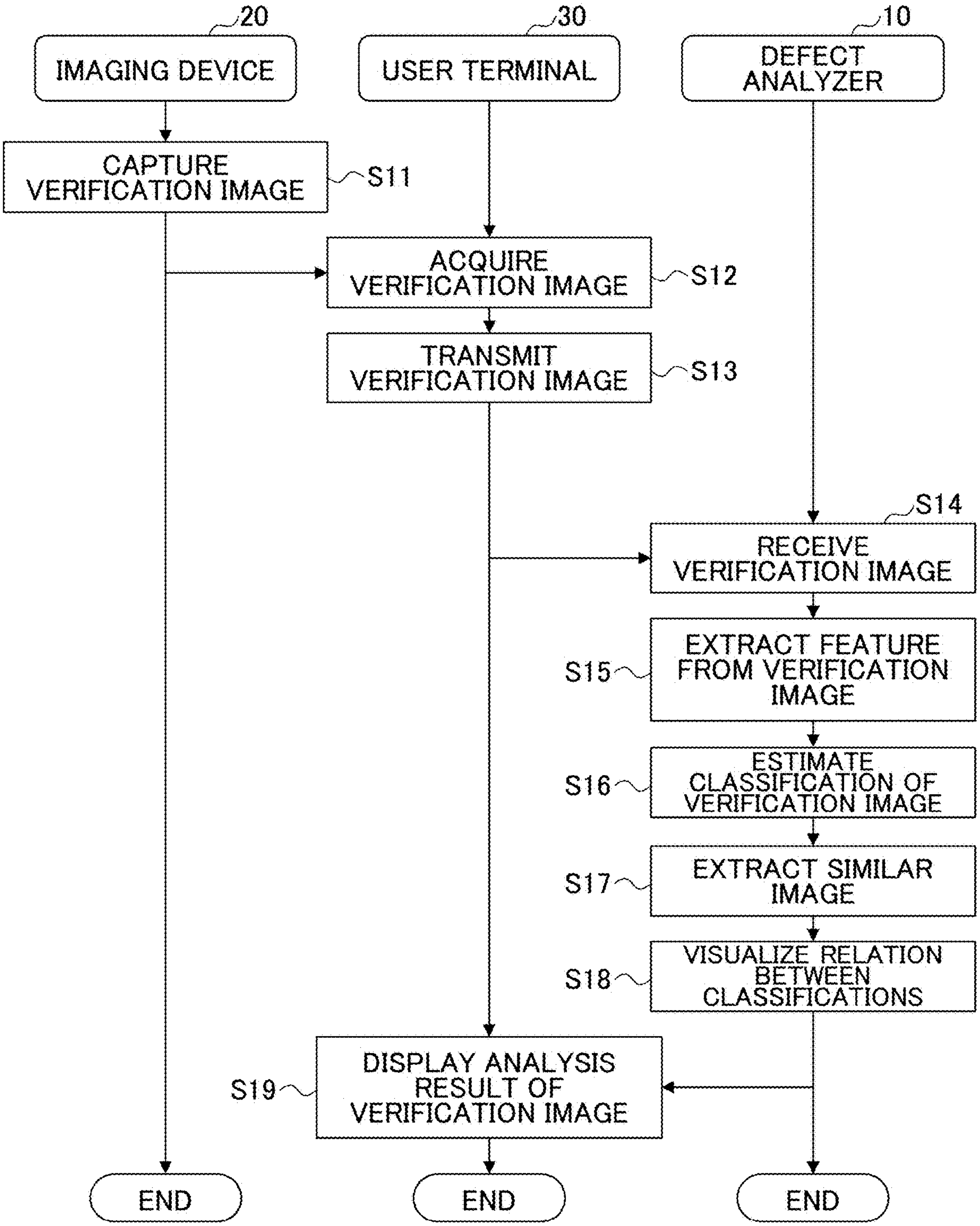
FIG. 9 is a flowchart showing an example of the procedure of an image classification process.

FIG. 9 is a flowchart illustrating an example of the procedure of the image classification process according to the present embodiment. The image classification process is a process in which a classification of a given defect, imaged in the verification image, is estimated using the trained feature extraction model, and then the relation between the verification image and the classification of the given defect is visualized.

In step S11, the imaging unit 201 included in the image acquisition device 20 images a given defect on the object, and generates an image of the given defect. Then, the imaging unit 201 stores the generated image of the given defect in the image storage 202. The image storage 202 stores a plurality of images of defect.

In step S12, the image acquisition unit 301 included in the user terminal 30 transmits a request to acquire a verification image, to the image acquisition device 20, in response to a user operation. The image acquisition device 20 transmits one or more images of defects stored in the image storage 202 to the user terminal 30, in response to the request to acquire the verification image. The image acquisition unit 301 transmits the images of the defects that are received from the image acquisition device 20, to the image transmitter 303.

In step S13, the image transmitter 303 included in the user terminal 30 receives the images of the defects from the image acquisition unit 301. Next, the image transmitter 303 transmits a verification image, selected from the images of the defects, to the defect analyzer 10, in response to a user operation.

In step S14, the image receiver 101 included in the defect analyzer 10 receives the verification image from the user terminal 30. Next, the image receiver 101 transmits the received verification image to the feature extraction unit 105.

In step S15, the feature extraction unit 105 included in the defect analyzer 10 receives the verification image from the image receiver 101. Next, the feature extraction unit 105 reads out the feature extraction model stored in the model storage 104. Subsequently, the feature extraction unit 105 generates a verification feature by inputting the verification image to the feature extraction model. The feature extraction unit 105 transmits the generated verification feature to the classification estimation unit 108.

In step S16, the classification estimation unit 108 included in the defect analyzer 10 receives the verification feature from the feature extraction unit 105. Next, the classification estimation unit 108 acquires a representative point of each classification, from the representative-point determination unit 106. Subsequently, the classification estimation unit 108 arranges the verification feature and the representative point of each classification, in the embedding space. Next, the classification estimation unit 108 calculates a distance between the verification feature and the representative point of each classification. Next, the classification estimation unit 108 estimates a classification of a given defect that is imaged in the verification image, based on the distance between the verification feature and the representative point of each classification.

The classification estimation unit 108 estimates the classification of the given defect imaged in the verification image, by comparing the distance between the verification feature and the representative point of each classification, with a predetermined threshold. The threshold used in the estimating may be set to any value that is obtained based on a user operation.

When there is one representative point for which a distance from the verification feature is less than or equal to the threshold, the classification estimation unit 108 determines that the verification image matches the classification corresponding to the one representative point. When there is a plurality of representative points for each of which a distance from the verification feature is less than or equal to the threshold, the classification estimation unit 108 determines that the verification image matches classifications corresponding to the plurality of representative points. When there is no representative point for which a distance from the verification feature is less than or equal to the threshold, the classification estimation unit 108 determines that the verification image matches a new classification.

The classification estimation unit 108 transmits the verification feature and an estimation result indicating the estimated classification, to the similar-image extraction unit 109. The classification estimation unit 108 assigns a defect label indicating the estimated classification to the verification image, and then may add the defect label to learned data stored in the learned data storage 102.

In step S17, the similar-image extraction unit 109 included in the defect analyzer 10 receives the verification feature and the estimation result, from the classification estimation unit 108. Next, the similar-image extraction unit 109 retrieves, from the learned data storage 102, one or more learned images to which a defect label, indicating the same classification as indicated in the estimation result, is assigned. Subsequently, the similar-image extraction unit 109 calculates a distance between the learned feature, corresponding to each of the retrieved one or more learned images, and the verification feature.

The similar-image extraction unit 109 extracts a similar image from the retrieved one or more learned images, based on calculated distances between the learned features and the verification feature. The similar-image extraction unit 109 may extract all learned images for which distances from the verification feature are each less than or equal to a predetermined threshold, or may extract a predetermined number of learned images in ascending order of distance from the verification feature. The similar-image extraction unit 109 transmits the verification feature, the estimation result, and one or more similar images, to the relation visualization unit 107.

Figure 10:
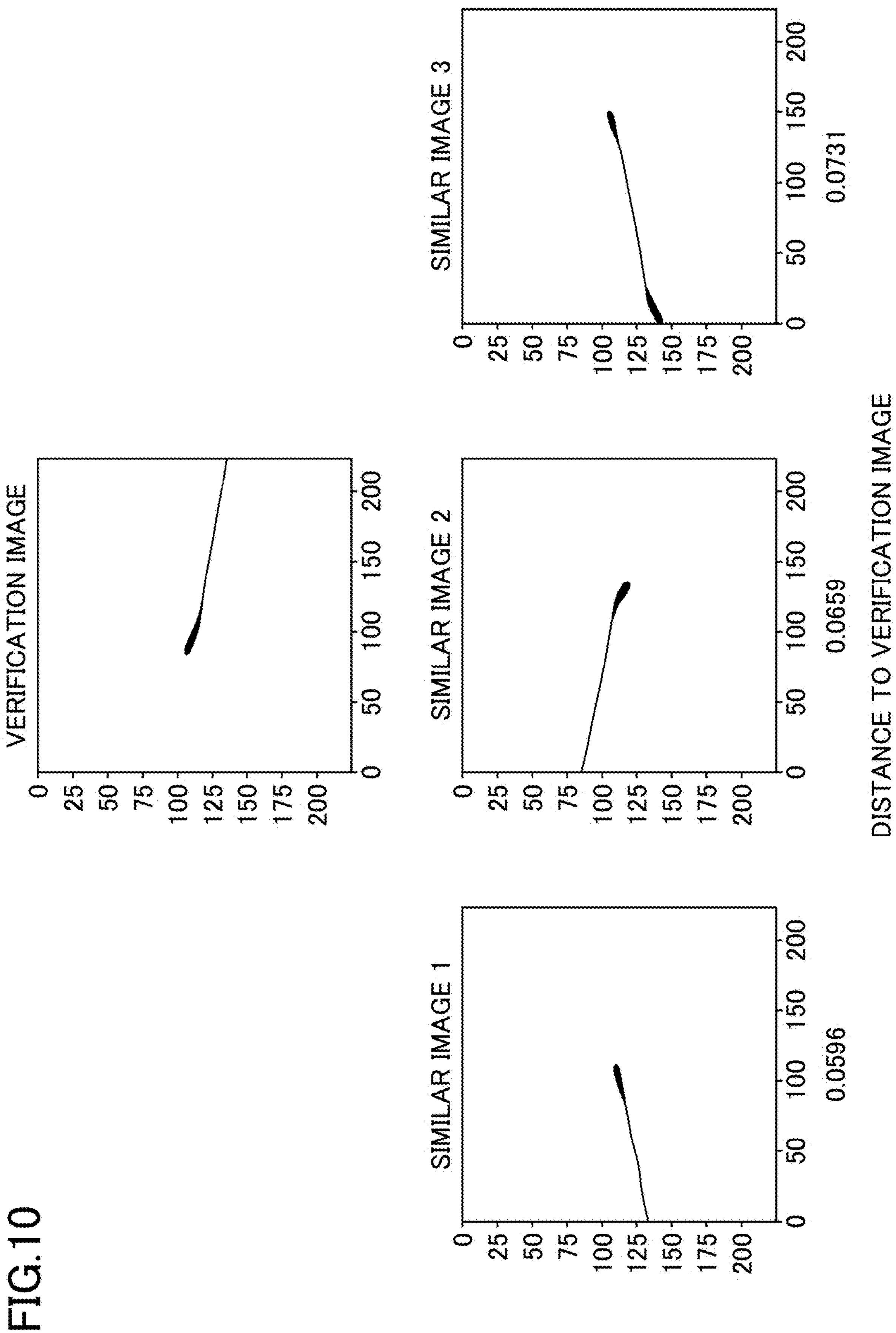
FIG. 10 is a diagram showing an example of similar images.

FIG. 10 is a diagram illustrating an example of similar images. The example in FIG. 10 illustrates the result in which three similar images, for each of which a distance from the verification image is decreased, are extracted in ascending order of distance. In the example of FIG. 10, a thin horizontal line that extends in a horizontal direction from a portion in the vicinity of the center of the verification image is imaged. In similar images 1 to 3, horizontal lines having the same thickness as the verification image are imaged, and it is understood that the similar images 1 to 3 are similar to the verification image. As shown in FIG. 10, information indicating a distance from the verification image may be added to each similar image.

Referring back to FIG. 9, the description will be provided as follows. In step S18, the relation visualization unit 107 included in the defect analyzer 10 receives the verification feature, the estimation result, and the one or more similar images, from the similar-image extraction unit 109. Next, the relation visualization unit 107 generates information indicating the relation between the verification image and classifications, based on the distance between the verification feature and representative points of the classifications. The relation visualization unit 107 transmits the information indicating the relation between the verification image and the classifications, to the user terminal 30.

The relation visualization unit 107 can provide the relation between the verification image and the classifications, in the same manner as the approach to provide the relation between classifications in the relation visualization process. That is, the relation visualization unit 107 can provide the relation between the verification image and the classifications, by using the heat map, the scatter plot, or the dendrogram.

(Heat Map)

Figure 11:
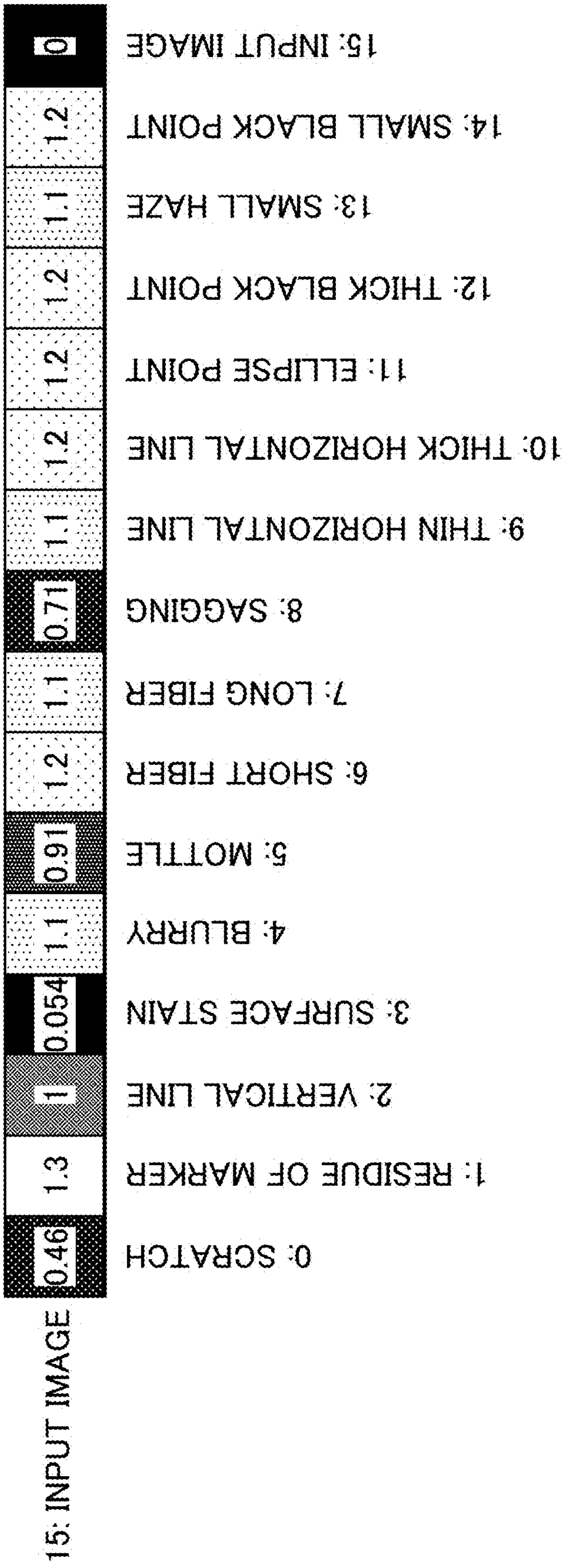
FIG. 11 is a diagram showing an example of the heat map in the image classification process.

FIG. 11 is a diagram illustrating an example of the heat map in the image classification process. As illustrated in FIG. 11, the heat map in the image classification process is a matrix in which the verification image is expressed as "15: input image," and distances to representative points for respective classifications are each color-coded according to a corresponding length. The user can recognize a similarity relationship between the verification image and each classification, by checking color shading in the heat map.

(Scatter Plot)

Figure 12:
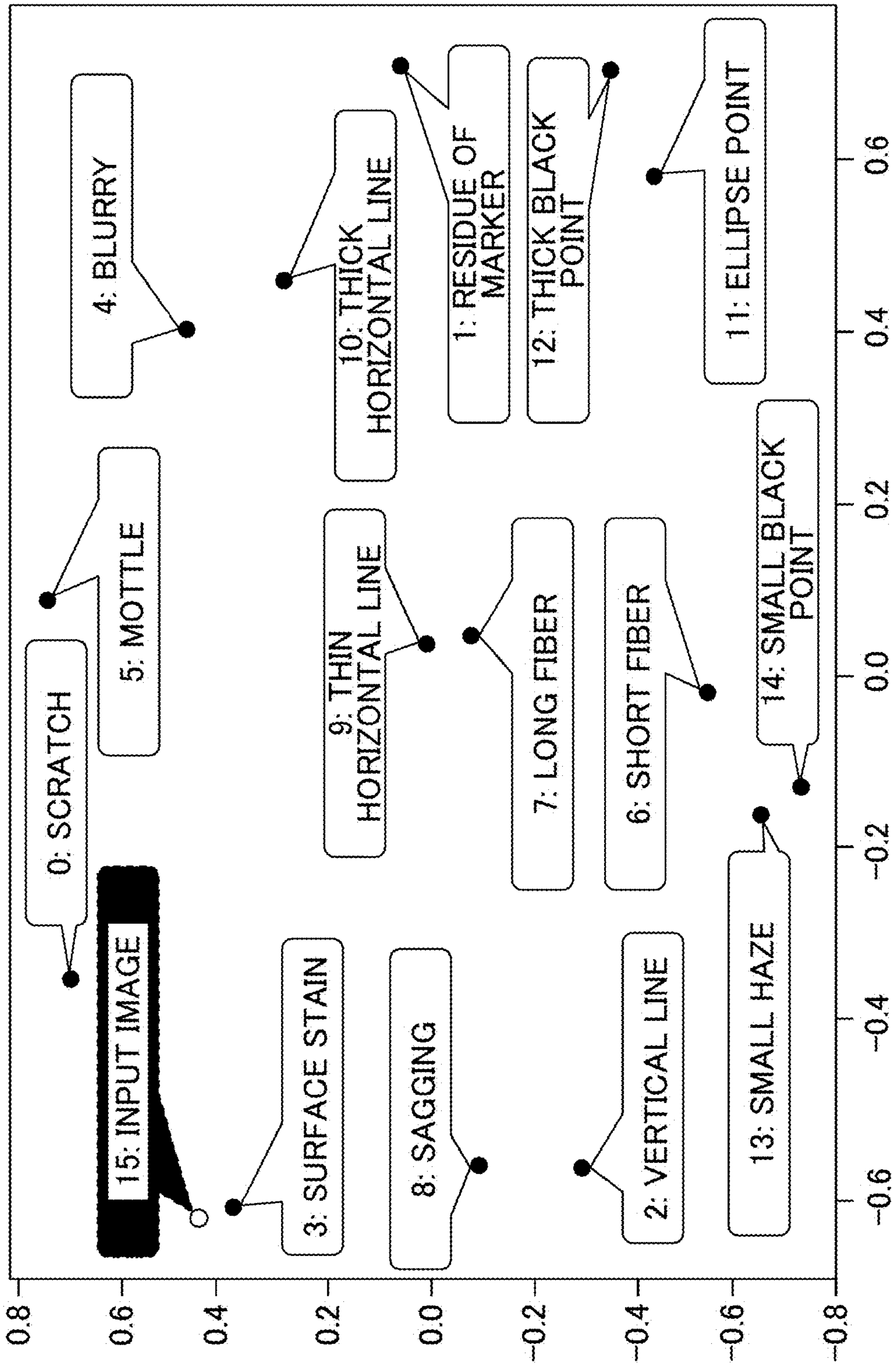
FIG. 12 is a diagram showing an example of the scatter plot in the image classification process.

FIG. 12 is a diagram illustrating an example of the scatter plot in the image classification process. As shown in FIG. 12, the scatter plot in the image classification process is a graph on which the verification image is expressed as "15: input image," and the verification feature and representative points for respective classifications are arranged on a two-dimensional plane based on multi-dimensional scaling. The user can recognize a similarity relationship between the verification image and each classification, by checking a distance between the input image and the representative point for each classification in the scatter plot.

(Dendrogram)

Figure 13:
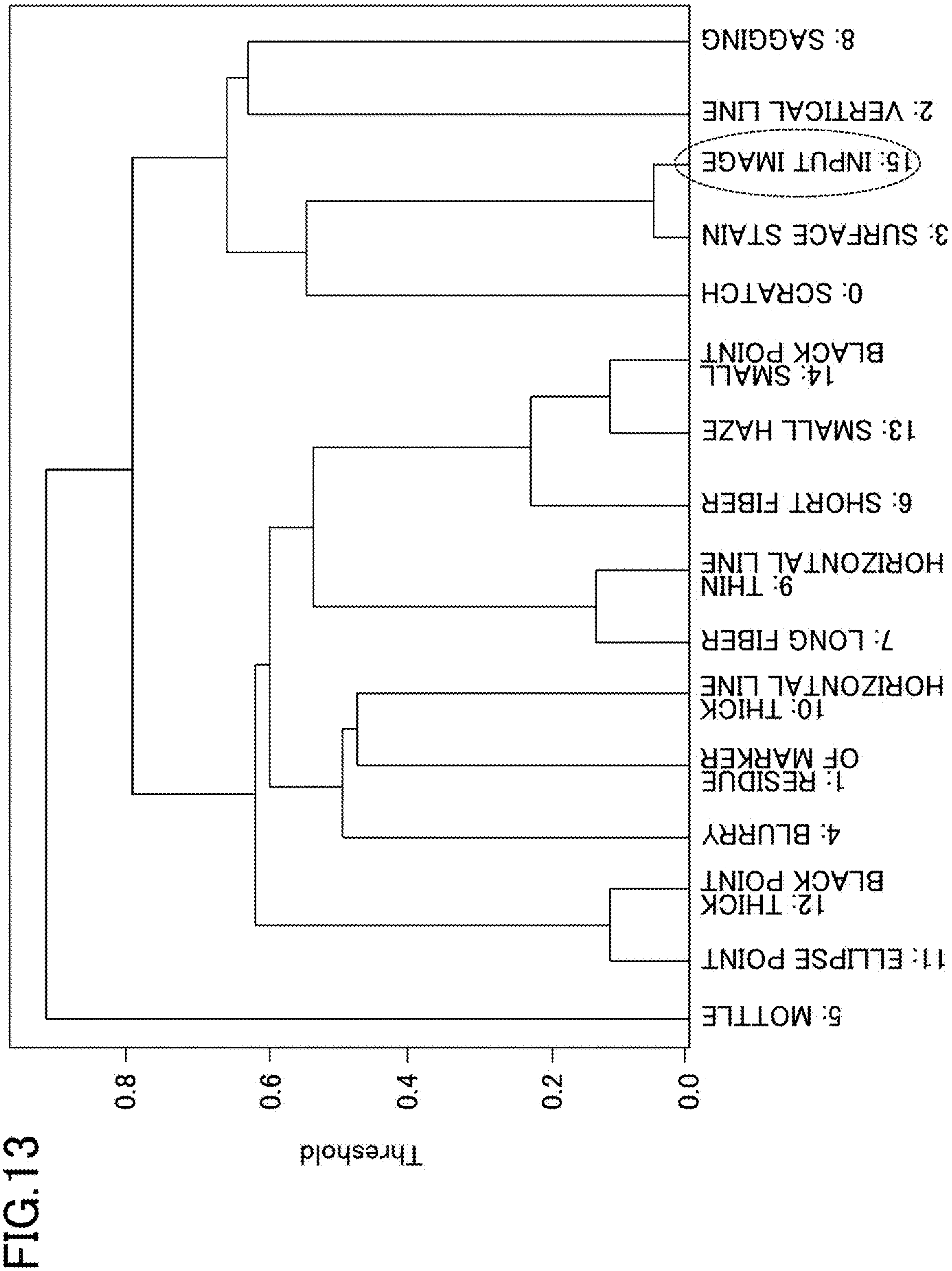
FIG. 13 is a diagram showing an example of the dendrogram in the image classification process.

FIG. 13 is a diagram showing an example of the dendrogram in the image classification process. As shown in FIG. 13, the dendrogram in the image classification process is a tree diagram in which the verification image is expressed as "15: input image," and the input image and representative points for respective classifications are hierarchized in a tree structure based on hierarchical clustering. The user can recognize a similarity relationship between the verification image and each classification, by checking a length of a path connecting the input image and each classification and a height of a branch in the dendrogram.

Referring back to FIG. 9, the description will be provided as follows. In step S19, the result display unit 304 included in the user terminal 30 receives the information indicating the relation between the verification image and the classifications, from the defect analyzer 10. Next, the result display unit 304 displays the information indicating the relation between the verification image and the classifications, on the display device 506.

<<Model Retraining Process>>

Figure 14:
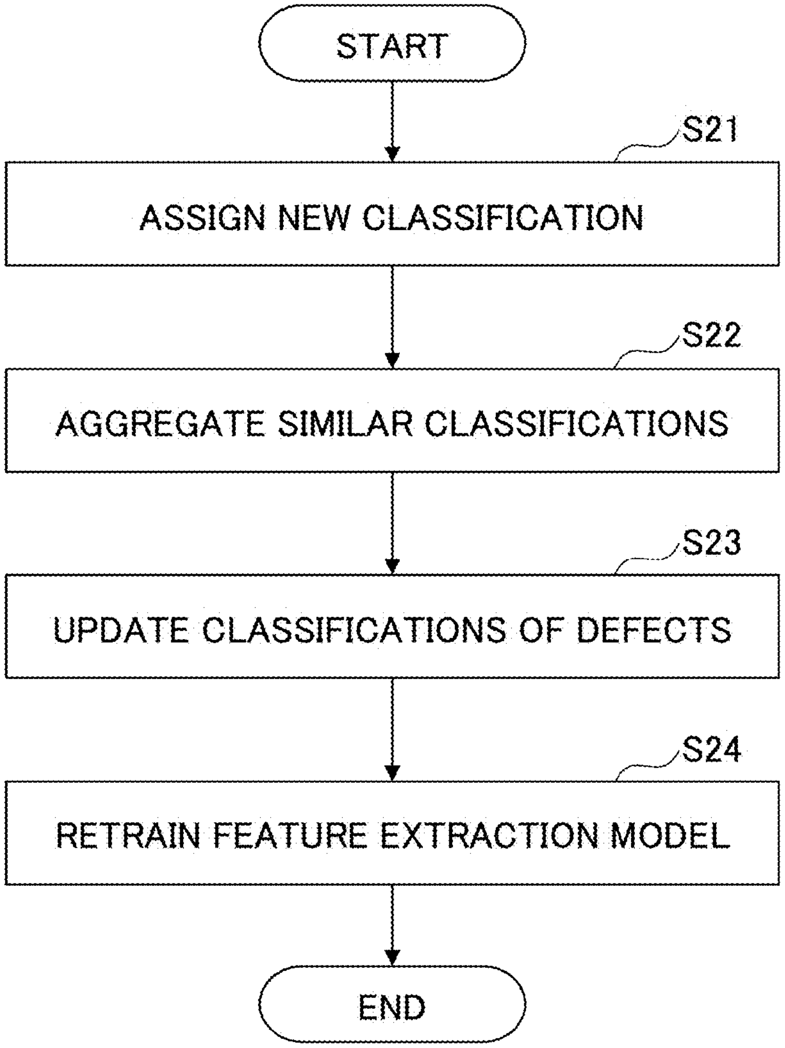
FIG. 14 is a flowchart showing an example of the procedure of a model retraining process.

FIG. 14 is a flowchart illustrating an example of the procedure of the model retraining process according to the present embodiment. The model retraining process is a process in which classifications of defects are reorganized based on an analysis result and then the feature extraction model is retrained using learned data to which the classifications after reorganization are assigned.

In step S21, if it is determined that the verification image matches a new class in the image classification process, the classification estimation unit 108 included in the defect analyzer 10 assigns a defect label indicating the new classification, to the verification image, and then adds the defect label to learned data stored in the learned data storage 102.

In step S22, the classification aggregator 110 included in the defect analyzer 10 acquires the representative point of each classification, from the representative-point determination unit 106. Next, the classification aggregator 110 arranges representative points for classifications, in the embedding space. Subsequently, the classification aggregator 110 determines whether there are a plurality of classifications for which a distance between representative points for the respective classifications is less than or equal to a predetermined threshold, based on the embedding space in which the representative points for the respective classifications are arranged. If there are a plurality of classifications for which a distance between the representative points is less than or equal to the threshold, the classification aggregator 110 determines a consolidated classification that includes the plurality of classifications. For the consolidated classification, one classification among the plurality of classifications may be selected, or a new classification may be adopted.

The threshold used in the classification aggregator 110 that performs the determination may be the same value as the threshold used in the classification estimation unit 108 that performs the estimation, or a different value may be adopted. As the threshold used in the determination, any value that is obtained based on a user operation may be set, as in the threshold used in the above estimation.

In step S23, the classification aggregator 110 included in the defect analyzer 10 retrieves, from the learned data storage 102, pieces of learned data to which respective defect labels representing classifications included in the consolidated classification are assigned. Next, the classification aggregator 110 changes each defect label assigned to the retrieved learned data, to a defect label indicating the consolidated classification. Subsequently, the classification aggregator 110 stores the learned data to which the defect label indicating the consolidated classification is assigned, in the learned data storage 102.

In step S24, the model training unit 103 included in the defect analyzer 10 retrieves learned data from the learned data storage 102. Next, the model training unit 103 reads out the feature extraction model stored in the model storage 104. Subsequently, the model training unit 103 retrains the feature extraction model, using the retrieved learned data. Next, the model training unit 103 stores the retrained feature extraction model in the model storage 104.

<Effects of the Embodiments>

The defect analysis system according to the present embodiments trains a feature extraction model based on learned data in which each classification of a given defect is assigned to the image of the given defect. The feature extraction model is trained so as to extract, from the input image, one or more image features that make the distance between similar images small. The defect analysis system outputs information representing the relation between classifications of defects, based on distances between representative points that are determined from image features of the images of defects. With this arrangement, in the defect analysis system of the present embodiment, a given classification of defect can be analyzed based on the image obtained by imaging the defect.

In particular, the defect analysis system according to the present embodiment can visualize the relation between classifications of defects in various representation forms, such as a heat map, a scatter plot, and a dendrogram in which the distance between representative points is visualized. With this arrangement, the defect analysis system according to the present embodiment can output an analysis result that is highly satisfactory to the user.

The defect analysis system according to the present embodiment estimates the classification of a given defect imaged in the verification image, based on the distance between a given image feature of the verification image, in which the classification of the given defect is not specified, and a given representative point for each classification. At this time, one or more images similar to the verification image may be extracted from images of defects included for the estimated classification, and the images may be output together with an estimation result. With this arrangement, the defect analysis system of the present embodiment can output the estimation result with a high sense of satisfaction for an intermediate defect similar to any classifications or a new defect different from any predetermined classifications.

Further, the defect analysis system according to the present embodiment retrains the feature extraction model by using learned data to which a new classification in which a verification image does not match any classifications or a consolidated classification including a plurality of classifications, for which a distance between representative points is short, is assigned. The retrained feature extraction model can be used to analyze the relation between classifications of defects that are reorganized based on the analysis result. With this arrangement, in the defect analysis system of the present embodiment, it is possible to acquire the classification of the defect suitable for a use environment of the user, and it is possible to output the analysis result that is more satisfactory to the user.

Supplement

Each function described in the above embodiments can be implemented by one or more processing circuits. Here, a "processing circuit" in the present specification includes a processor programmed to implement each function by software, such as a processor implemented by an electronic circuit, and also includes a device such as an application specific integrated circuit (ASIC), a digital signal processor (DSP), a field programmable gate array (FPGA), or a conventional circuit module that is designed to implement each function described above.

Although the embodiments of the present invention are described above in detail, the present invention is not limited to these embodiments, and various modifications or changes can be made within the scope of the gist of the present invention set forth in the claims.

This application claims priority to Japanese Patent Application No. 2022-111662, filed Jul. 12, 2022 with Japan Patent Office, the entire contents of which are incorporated herein by reference.

DESCRIPTION OF SYMBOLS

1 defect analysis system
10 defect analyzer
101 image receiver
102 learned data storage
103 model training unit
104 model storage
105 feature extraction unit
106 representative-point determination unit
107 relation visualization unit
108 classification estimation unit
109 similar-image extraction unit
110 classification aggregator
20 image acquisition device
201 imaging unit
202 image storage
30 user terminal
301 image acquisition unit
302 classification assignment unit
303 image transmitter
304 result display unit

The invention claimed is:

1. A defect analyzer comprising:
a memory that stores a feature extraction model that is trained based on learned data including
(i) an image of each defect obtained by imaging the defect that occurs on a surface of an object, and
(ii) information indicative of at least one of a plurality of classifications representing types of defects in images, the feature extraction model being configured to extract, from an input image, an image feature in which a distance between similar images is decreased; and
circuitry configured to
determine a representative point for each classification of the plurality of classifications, based on one or more image features that are extracted from respective images of defects by using the feature extraction model; and
output information indicating a relation between classifications, based on one or more distances that are each between representative points,
wherein the representative point for each classification is defined by coordinates representing a learned feature set arranged in an embedding space, the learned feature set corresponding to learned images to which information indicative of an identical classification is assigned, and
wherein the representative point includes a centroid of the learned feature set or an average of the learned feature set.

2. The defect analyzer according to claim 1, wherein the circuitry is configured to
receive an input of a verification image that is obtained by imaging the surface of the object;
generate, as a verification feature, the image feature that is extracted from the verification image by using the feature extraction model; and
estimate a classification for the verification image based on a distance between the verification feature and each of the representative points.

3. The defect analyzer according to claim 2, wherein the circuitry is configured to
extract, from the learned data, the image of the defect that is similar to the verification image, based on one or more distances that are each between image features.

4. The defect analyzer according to claim 1, wherein the circuitry is configured to
determine a consolidated classification that includes given classifications for which a distance between representative points is decreased; and
retrain the feature extraction model based on the learned data to which information indicating the consolidated classification is assigned.

5. The defect analyzer according to claim 1, wherein the information indicating the relation includes a heat map in which distances between representative points are each color-coded according to a length of the distance, a scatter plot in which the representative points are arranged based on multi-dimensional scaling, or a dendrogram in which the representative points are hierarchized based on hierarchical clustering.

6. The defect analyzer according to claim 2, wherein the circuitry is configured to compare the distance between the verification feature and each of representative points, with a threshold, and estimate the classification for the verification image.

7. The defect analyzer according to claim 6, wherein upon occurrence of a condition in which there are given classifications for which the distance is less than or equal to the threshold, the circuitry is configured to estimate that the verification image matches the given classifications.

8. The defect analyzer according to claim 6, wherein upon occurrence of a condition in which there are no classifications for which the distance is less than or equal to the threshold, the circuitry is configured to estimate that the verification image matches a new classification different from the classifications.

9. A method for analyzing a defect executed by a defect analyzer, the method comprising:

storing, in a memory, a feature extraction model that is trained based on learned data including (i) an image of each defect obtained by imaging the defect that occurs on a surface of an object, and (ii) information indicative of at least one of a plurality of classifications representing types of defects in images, the feature extraction model being configured to extract, from an input image, an image feature in which a distance between similar images is decreased;

determining a representative point for each classification of the plurality of classifications, based on one or more image features that are extracted from respective images of defects by using the feature extraction model; and outputting information indicating a relation between classifications, based on one or more distances that are each between representative points, wherein the representative point for each classification is defined by coordinates representing a learned feature set arranged in an embedding space, the learned feature set corresponding to learned images to which information indicative of an identical classification is assigned, and wherein the representative point includes a centroid of the learned feature set or an average of the learned feature set.

10. A non-transitory computer readable storage medium storing a program that causes a computer to execute a method, the method comprising:

storing, in a memory, a feature extraction model that is trained based on learned data including (i) an image of each defect obtained by imaging the defect that occurs on a surface of an object, and (ii) information indicative of at least one of a plurality of classifications representing types of defects in images, the feature extraction model being configured to extract, from an input image, an image feature in which a distance between similar images is decreased;

determining a representative point for each classification of the plurality of classifications, based on one or more image features that are extracted from respective images of defects by using the feature extraction model; and outputting information indicating a relation between classifications, based on one or more distances that are each between representative points, wherein the representative point for each classification is defined by coordinates representing a learned feature set arranged in an embedding space, the learned feature set corresponding to learned images to which information indicative of an identical classification is assigned, and wherein the representative point includes a centroid of the learned feature set or an average of the learned feature set.

* * * * *